(12) United States Patent
Rodriguez

(10) Patent No.: US 9,183,368 B2
(45) Date of Patent: *Nov. 10, 2015

(54) VALIDATING CONTROL OF DOMAIN ZONE

(75) Inventor: Eric Rodriguez, Tolleson, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 1536 days.

This patent is subject to a terminal disclaimer.

(21) Appl. No.: 12/019,216

(22) Filed: Jan. 24, 2008

(65) Prior Publication Data

US 2009/0193070 A1 Jul. 30, 2009

(51) Int. Cl.
*G06F 15/16* (2006.01)
*G06F 21/33* (2013.01)

(52) U.S. Cl.
CPC ................................. *G06F 21/335* (2013.01)

(58) Field of Classification Search
USPC ......................................................... 709/245
See application file for complete search history.

(56) References Cited

U.S. PATENT DOCUMENTS

| | | | | |
|---|---|---|---|---|
| 6,976,090 | B2 * | 12/2005 | Ben-Shaul et al. | 709/246 |
| 7,734,745 | B2 | 6/2010 | Gloe | |
| 2003/0126431 | A1 | 7/2003 | Beattie et al. | |
| 2004/0083306 | A1 * | 4/2004 | Gloe | 709/245 |
| 2005/0102354 | A1 * | 5/2005 | Hollenbeck et al. | 709/203 |
| 2006/0015716 | A1 | 1/2006 | Thornton et al. | |
| 2008/0021890 | A1 | 1/2008 | Adelman et al. | |
| 2008/0022013 | A1 | 1/2008 | Adelman et al. | |
| 2008/0028443 | A1 | 1/2008 | Adelman et al. | |
| 2008/0034211 | A1 * | 2/2008 | Shull et al. | 713/175 |

OTHER PUBLICATIONS

RFC 1035, Nov. 1987.*
Ramaswamy Chandramouli and Scott Rose "Challenges in Securing the Domain Name System", IEEE Security & Privacy, 2006, pp. 84-87.*
RFC 1034, Nov. 1987.*
Chandramouli, An Integrity Verification Scheme for DNS Zone file based on Security Impact Analysis.
SSL Certificate Validation Procedures, Printout from website at http://www.xramp.com, Jul. 2006.
Mockapetris, RFC1035, Domain Names—Implementation and Specification, Nov. 1987.
Rosenbaum, RFC1464, Using the Domain Name System to Store Arbitrary String Attributes, May 1993.
Aug. 8, 2011 office action in related U.S. Appl. No. 12/019,236.
Oct. 13, 2011 response to Aug. 8, 2011 office action in related U.S. Appl. No. 12/019,236.

* cited by examiner

*Primary Examiner* — Vivek Srivastava
*Assistant Examiner* — Hermon Asres
(74) *Attorney, Agent, or Firm* — Quarles & Brady LLP

(57) ABSTRACT

A requester requests a domain zone control validation from a validating entity. The validating entity generates a pass string. The requester enters the pass string into a domain zone. The validating entity determines if the pass string was entered in the domain zone. If the pass string is present in the domain zone, the domain zone control was successfully validated.

19 Claims, 5 Drawing Sheets

Dear Secure Certificate Customer,

We have received a Certificate Signing Request for the domain:
xxxcommonnamexx.

To continue the process, we need to validate your domain access or control.

We have failed to automatically retrieve an email address for the domain name Registrant nor Administrative Contact. It appears your whois record does not present valid or public email address contacts or has private registration in place, you can proceed with domain zone record validation.

There are several alternative methods you can choose from below to facilitate the validation of your domain access control.

Here is a special code for you to use in your choice of one of the two methods below:
xxdzccodexx If you are able to make Domain Name Zone changes, you can use the Domain Zone Control validation process or if you are able to make a website page and store it in the root of your hosting account, you can use the Domain Website Control validation process.

Domain Zone Control validation: Access your domain name's DNS control panel and create a "cname" using the special code above.

After you have created the cname using the special code, send us an email to tell us you are ready for our review. Include your customer account number and the certificate common name and list the type of validation as "DZC".

For an explanation of a "cname" please use this link:
http://help.godaddy.com/article.php?article_id=679

Domain Website Control validation: Create a website page and name it using the special code above.
Example: your domain name is mywebsitedomain.com and if the code is "1234dcf", you would create and publish a page named 1234dcf.html and we would be able to see it by using mywebsitedomain.com/1234dcf.html . Please use html as the page extension.

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

<i>The webpage will also need to contain the special code in the body. We will not accept a blank page. </i>

After you have published the page, send us an email to tell us you are ready for our review. Include your customer account number and the certificate common name and list the type of validation as "WSC".

If you do not have the ability to make Domain Name Zone changes or make a special website page, you will need to send us a Digital Action Form. This form can be downloaded by using the link below. Please review the instructions located on the form regarding required identification documentation:

<a href=http://downloads.godaddy.com/starfield/digital_action.doc>http://downloads.godaddy.com/starfield/digital_action.doc</a>

If you encounter any problems or have any questions, our Customer Support department is ready to help, around-the-clock, seven days a week.

Customer Support:
E-Mail: ra@godaddy.com
Phone: 480.505.8852
Fax: 480.624.2548

For further information, log in to your SSL account at:
https://certificates.godaddy.com.

FIG. 3b

```
$TTL    86400

@       IN      SOA     ns1.sample-dns-server.com. info.example.com. (
                        2008021501      ; YYYYMMDDnn, where 'nn' is the revision
                        10800           ; Refresh
                        3600            ; Retry
                        604800          ; Expire
                        3600)           ; Minimum example.com.                    IN NS           ns1.sample-dns-server.com.
example.com.                    IN NS           ns2.sample-dns-server.com.
ns1.sample-dns-server.com.      IN A            68.178.12.176
ns2.sample-dns-server.com.      IN A            68.178.12.121
webmail.example.com.            IN A            68.178.12.176
mssql.example.com.              IN A            68.178.12.176
sitebuilder.example.com.        IN A            68.178.12.176
mail.example.com.               IN A            68.178.12.176
example.com.                    IN A            68.178.12.176
ftp.example.com.                IN CNAME        example.com.
www.example.com.                IN CNAME        example.com.
example.com.                    IN MX           10 mail.example.com.
```

FIG. 4a

```
$TTL    86400

@       IN      SOA     ns1.sample-dns-server.com. info.example.com. (
                        2008021502      ; YYYYMMDDnn, where 'nn' is the revision
                        10800           ; Refresh
                        3600            ; Retry
                        604800          ; Expire
                        3600)           ; Minimum example.com.                    IN NS           ns1.sample-dns-server.com.
example.com.                    IN NS           ns2.sample-dns-server.com.
ns1.sample-dns-server.com.      IN A            68.178.12.176
ns2.sample-dns-server.com.      IN A            68.178.12.121
webmail.example.com.            IN A            68.178.12.176
mssql.example.com.              IN A            68.178.12.176
sitebuilder.example.com.        IN A            68.178.12.176
mail.example.com.               IN A            68.178.12.176
example.com.                    IN A            68.178.12.176
ftp.example.com.                IN CNAME        example.com.
www.example.com.                IN CNAME        example.com.
pass-string123.example.com.     IN CNAME        example.com.
example.com.                    IN MX           10 mail.example.com.
```

VALIDATING CONTROL OF DOMAIN ZONE

CROSS REFERENCE TO RELATED PATENT APPLICATIONS

The present application is related to copending U.S. patent application Ser. No. 12/019,236, titled "Issuing Secure Certificate Using Domain Zone Control Validation," and filed Jan. 24, 2008.

FIELD OF THE INVENTION

The present invention relates to a method and system for validating control of a domain zone.

BACKGROUND OF THE INVENTION

The Internet comprises a vast number of computers and computer networks that are interconnected through communication links. The interconnected computers exchange information using various services, such as electronic mail, Gopher, and the World Wide Web (WWW). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator (URL). To view a specific Web page, a client computer system specifies the URL for the Web page in a request (e.g., a HyperText Transfer Protocol (HTTP) request). These follow the familiar format http://www.example.com uniquely identifying the particular resource. The request is forwarded to the Web server that supports that Web page to the client computer system. When the client computer system receives that Web page, it typically displays the Web page using a browser. A browser is a special-purpose application program that effects the requesting of Web pages and the displaying of Web pages.

The domain name system (DNS) is the world's largest distributed computing system that enables access to any resource in the Internet by translating user-friendly domain names to IP Addresses. The process of translating domain names to IP Addresses is called Name Resolution. A DNS name resolution is the first step in the majority of Internet transactions. The DNS is in fact a client-server system that provides this name resolution service through a family of servers called Domain Name Servers. The hierarchical domain space is divided into administrative units called zones. A zone usually consists of a domain (say example.com) and possibly one or more sub domains (projects.example.com, services.example.com). The authoritative data needed for performing the name resolution service is contained in a file called the zone file and the DNS servers hosting this file are called the authoritative name servers for that zone. The DNS clients that make use of the services provided by authoritative name servers may be of two types. One type is called a stub resolver that formulates and sends a query every time it receives a request from an application that requires Internet service (e.g., a browser). The other type is called a caching (also called recursive/resolving) name server that caches the name resolution responses it has obtained from authoritative name servers and thus able to serve multiple stub resolvers.

The zone file hosted on an authoritative name server consists of various types of records called Resource Records (RRs). Associated with each DNS resource record is a type (RRtype). The code for these RRtypes is assigned by an international organization called Internet Assigned Names Authority (IANA). An RR of a given RRtype in a zone file provides a specific type of information. Some of the common RRtype codes are: NS, MX, CNAME, and A. An NS RR in a zone file gives the fully qualified domain name (FQDN) of the host that is considered the name server for that zone. For example, an NS RR in the zone file of the zone example.com may give the information that the host ns1.projects.example.com is a name server for the domain projects.example.com. Similarly an MX RR gives the host name for a mail server for the zone. An A RR gives the IP address for a host in a domain within the zone. CNAME provides "canonical name" records and maps names in the zone file. A zone file generally consists of multiple RRs of a given RRtype with some exceptions (e.g., there can be only SOA RR in a zone file). It can also have multiple RRs for the same domain name and same (or different) RRtype (e.g., multiple name servers or mail servers for a domain services.example.com).

The DNS infrastructure consists of many different types of DNS servers, DNS clients and transactions among/between these entities. The most important transaction in DNS is the one that provides the core service of DNS (i.e., name resolution service) and is called the DNS Query/Response. A DNS Query/Response transaction is made up of a query originating from a DNS client (generically called a DNS resolver) and response from a DNS name server. The response consists of one or more RRs. These RRs may be served from its own zone file (for an authoritative name server) or from a cache of RRs obtained from other name servers (for a caching/resolving/recursive name servers). In this way, the DNS serves as a global, distributed database. Name servers (serving zone files) each contain a small portion of the global domain space, and clients issue queries using a domain name and a desired RRtype.

BRIEF DESCRIPTION OF THE DRAWINGS

FIG. 3 (views a and b) provides a sample email message that users may receive in connection with domain zone control validation.

FIG. 4a illustrates a sample domain zone file as text.

FIG. 4b illustrates a sample domain zone file with an addition of a Pass String.

DETAILED DESCRIPTION

Figure 1:
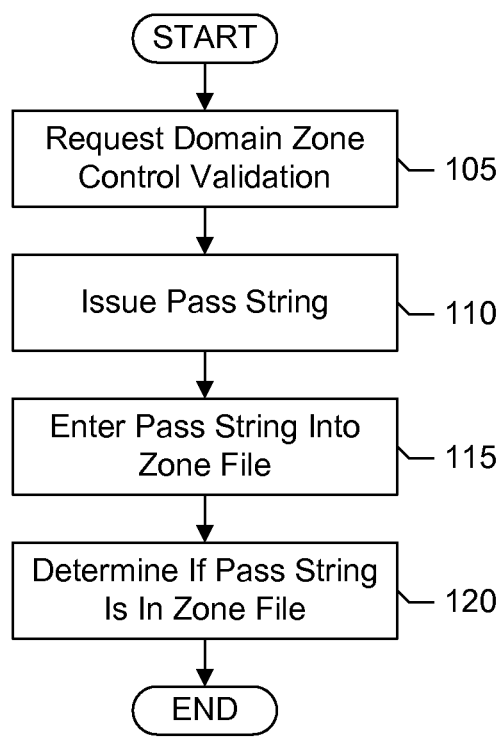
FIG. 1 is a flowchart showing a sample embodiment of a process of validating a domain zone control.

Referring to FIG. 1 a Requestor may request domain zone control validation from a Validating Entity (Step 105). The Requestor is an individual or an entity and typically is an owner, a registrant, or a record holder for a domain name, or otherwise responsible for maintaining the domain name. A Validating Entity is a Certification Authority, a Domain Name Registrar, a Domain Name Registry, or any other individual or entity validating control of a domain zone.

Domain zone control means a control over a domain zone, or ownership, possession, authority, or caretaking of the domain zone, or ability to access and alter domain zone records or DNS records. Further control over a domain zone often implies control over the domain name, i.e. a person who has control over the domain zone often has control over the domain name.

The request for a domain zone control validation may be received by the Validating Entity via email, through a website, or any other way. In response to the request, the Validating Entity generates and issues a Pass String and forwards (or otherwise communicates) it to the Requestor (Step 110). The Pass String (pass code, validation string, validation code, etc.) is a numeric, alpha, or alphanumeric string or a numeric value. Non alpha characters may be present in the Pass String as well. The Pass String may be unique for each domain name to reduce the chance of impersonation in case of an attempt for an unauthorized domain zone control validation.

The Requestor enters the Pass String into a domain zone (Step 115). The domain zone may be a flat text file or generated dynamically from computer settings. The domain zone may be located on a server, such as a DNS server or a hosting server. Most domain zone files contain space-separated values, however there are implementations that provide for character-separated values or formatted with a markup language, such as XML.

The Requestor may enter the Pass String into the fields specified by the Validating Entity. Preferably, the Pass String may be entered into the fields that have no or limited negative impact on the DNS resolution process or computational performance.

For example, the Pass String may be entered into TXT or CNAME fields of the domain zone. TXT may contain any string parameter. CNAME is an alias for a host record. CNAME allows more than one DNS name for a host record. CNAME records point back to an A record. So if the IP address of the A record is changed, all CNAME records pointed to that record automatically follow the new IP of the A record. Alternatively users may have multiple A records, but this requires multiple places to change the IP address, which increases the chance of error. Using CNAMEs makes DNS data easier to manage. The most common CNAMEs are www and ftp. FIG. 4 illustrates a sample domain zone file before (view a) and after (view b) addition of the Pass String in the text of the file. FIG. 4b shows a CNAME "passstring123" (line 405) added to the sample domain zone file.

Additional information on DNS and its records may be found at Mockapetris, RFC1035, Domain Names—Implementation and Specification, November 1987 and Rosenbaum, RFC 1464, Using the Domain Name System To Store Arbitrary String Attributes, May 1993, which are both hereby incorporated in their entirety by reference.

The Validating Entity may determine if the Pass String was entered in the domain zone (Step 120). Such determination may occur in a specified time or the Validating Entity may query the domain zone with a specified time interval until the Pass String appears in the domain zone. The Validating Entity may use DNS lookup commands, such as "dig" from computers running Unix, FreeBSD, or Linux operating systems or "nslookup" utility on Windows® or Unix computers.

Figure 2:
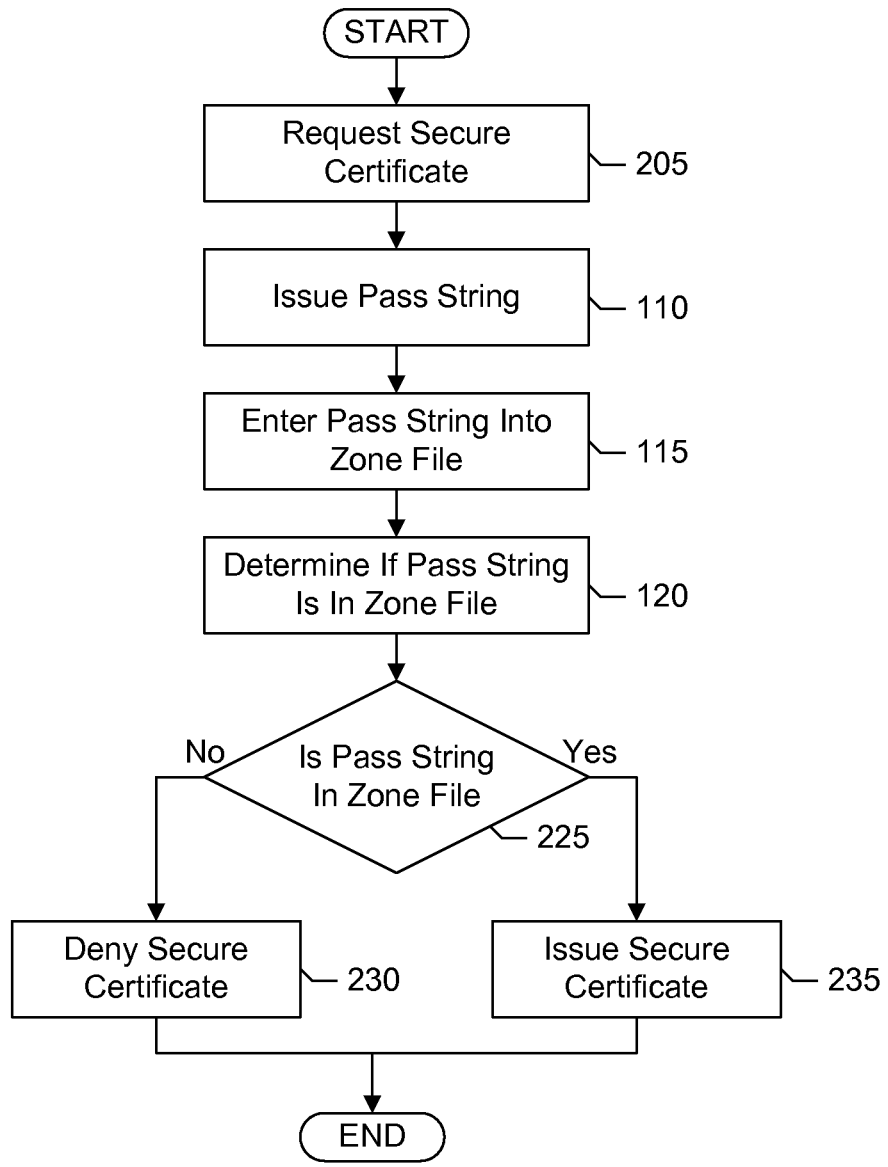
FIG. 2 is a flowchart showing a sample embodiment of a process of issuing a secure certificate using domain zone control validation.

In an alternative embodiment, illustrated in FIG. 2 the domain zone validation may be used to issue a secure certificate, such as an SSL certificate. A Requestor may request a secure certificate for a domain name from a Validating Entity, such as a Certification Authority (Step 205).

To verify that the Requestor has control over the domain name, the Validating Entity generates and issues a Pass String and forwards it to the Requestor (Step 110). The Pass String is a numeric, alpha, or alphanumeric string or a numeric value. The Pass String may be unique for each domain name to reduce the chance of impersonation in case of an attempt for an unauthorized domain zone control validation. The Requestor enters the Pass String into a domain zone (Step 115). The Validating Entity determines if the Pass String was entered in the domain zone (Step 120).

If the Validating Entity determines that the Pass String is present in the domain zone (Step 225) according to the instructions given to the Requestor, the Validating Entity may issue the secure certificate (Step 235). If the Pass String is not in the domain zone, then the Validating Entity may deny issuing the secure certificate to the Requestor (Step 230). Of course additional methods of validation and authentication may be used along with the domain zone validation.

The methods described above can be performed manually, partially automated, or fully automated.

The above-described embodiments have been provided by way of example, and the present invention is not limited to these examples. Multiple variations and modification to the disclosed embodiments will occur, to the extent not mutually exclusive, to those skilled in the art upon consideration of the foregoing description. Such variations and modifications, however, fall well within the scope of the present invention as set forth in the following claims.

The Abstract accompanying this specification is provided to enable the United States Patent and Trademark Office and the public generally to determine quickly from a cursory inspection the nature and gist of the technical disclosure and is in no way intended for defining, determining, or limiting the present invention or any of its embodiments.

The invention claimed is:

1. A method, comprising the steps of:
    a) a Validating Entity receiving, by one or more server computers communicatively coupled to a network and operated by said Validating Entity, a request for a validation of a control of a domain zone from one or more client computers communicatively coupled to said network and operated by a Requestor, wherein said domain zone contains one or more DNS records for a domain name on a DNS server computer, wherein said validation indicates whether said Requestor has the ability to modify said one or more DNS records for said domain name on said DNS server computer,
    b) said Validating Entity issuing, by said one or more server computers, a Pass String to said Requestor,
    c) said Validating Entity providing, by said one or more server computers, instructions to said Requestor via said one or more client computers, wherein said instructions contain one or more steps for entering said Pass String into said one or more DNS records in said domain zone for said domain name on said DNS server computer, and
    d) said Validating Entity determining whether said Pass String is located within said domain zone.

2. The method of claim 1, wherein said Validating Entity is a Certification Authority.

3. The method of claim 1, wherein said Validating Entity is a Registry.

4. The method of claim 1, wherein said Validating Entity is a Registrar.

5. The method of claim 1, wherein said one or more DNS records is a TXT DNS record of said domain zone.

6. The method of claim 1, wherein said one or more DNS records is a CNAME DNS record of said domain zone.

7. The method of claim 1, wherein said request for said validation of said control of said domain zone is received from said Requestor via an email message.

8. The method of claim 1, wherein said request for said validation of said control of said domain zone is received from said Requestor via a website.

9. The method of claim 1, wherein said determining whether said Pass String is located within said domain zone is performed by a computer.

10. The method of claim 1, wherein said Pass String is an alphanumeric string.

11. The method of claim 1, wherein said Pass String is a numeric value.

12. The method of claim 1, wherein said domain zone is flat text file.

13. The method of claim 1, wherein said domain zone contains space-separated values, contains character separated values or is formatted with a markup language.

14. A method, comprising the steps of:
   a) a Requestor requesting, by one or more client computers communicatively coupled to a network and operated by said Requestor, a validation of a control of a domain zone from one or more server computers communicatively coupled to a network and operated by a Validating Entity, wherein said domain zone contains one or more DNS records for a domain name on a DNS server computer, wherein said validation indicates whether said Requestor has the ability to modify said one or more DNS records for said domain name on said DNS server computer,
   b) said Requestor receiving, by said one or more client computers, a Pass String from said Validating Entity, via said one or more server computers,
   c) said Requestor receiving instructions, by said one or more client computers, from said Validating Entity, wherein said instructions contain one or more steps for entering said Pass String into said one or more DNS records in said domain zone for said domain name on said DNS server computer, and
   d) said Requestor entering said Pass String into said one or more DNS records in said domain zone for said domain name on said DNS server computer.

15. The method of claim 14, wherein said Validating Entity is a Certification Authority.

16. The method of claim 14, wherein said Validating Entity is a Registry.

17. The method of claim 14, wherein said Validating Entity is a Registrar.

18. The method of claim 14, wherein said Requestor is requesting said validation of said control of said domain zone from said Validating Entity via an email message.

19. The method of claim 14, wherein said Requestor is requesting said validation of said control of said domain zone from said Validating Entity via a website.

* * * * *